(12) United States Patent
Nam et al.

(10) Patent No.: US 11,009,855 B2
(45) Date of Patent: May 18, 2021

(54) METAL CARD AND METHOD FOR MANUFACTURING THE SAME

(71) Applicants: KONA I CO., LTD., Seoul (KR); KONA M CO., LTD., Chungcheongbuk-do (KR)

(72) Inventors: Ki sung Nam, Chungcheongbuk-do (KR); Han seon Kim, Chungcheongbuk-do (KR); Suk Ku Lee, Seoul (KR)

(73) Assignees: KONA I CO., LTD., Seoul (KR); KONA M CO., LTD., Jincheon-gun (KR)

( * ) Notice: Subject to any disclaimer, the term of this patent is extended or adjusted under 35 U.S.C. 154(b) by 98 days.

(21) Appl. No.: 16/269,704

(22) Filed: Feb. 7, 2019

(65) Prior Publication Data

US 2019/0384261 A1  Dec. 19, 2019

Related U.S. Application Data

(63) Continuation-in-part of application No. PCT/KR2018/006929, filed on Jun. 19, 2018.

(30) Foreign Application Priority Data

Jul. 31, 2018  (KR) .................. 10-2018-0089627

(51) Int. Cl.
  *G05B 19/4155*  (2006.01)
(52) U.S. Cl.
  CPC ............... *G05B 19/4155* (2013.01); *G05B 2219/33099* (2013.01); *G05B 2219/45234* (2013.01)

(58) Field of Classification Search
  CPC ...... G05B 19/4155; G05B 2219/33099; G05B 2219/45234; G06K 19/07722; G06K 19/02; G06K 19/077; G06K 19/07749
  See application file for complete search history.

(56) References Cited

U.S. PATENT DOCUMENTS

| | | | |
|---|---|---|---|
| 7,744,005 B2 * | 6/2010 | Yin | G06K 19/07749 235/380 |
| 9,390,366 B1 * | 7/2016 | Herslow | G06K 19/07769 |
| 10,140,569 B2 | 11/2018 | Kang et al. | |
| 10,289,944 B2 * | 5/2019 | Herslow | G06K 19/07722 |
| 2004/0217178 A1 * | 11/2004 | Lasch | B42D 25/00 235/488 |
| 2005/0006482 A1 | 1/2005 | Kano et al. | |

(Continued)

FOREIGN PATENT DOCUMENTS

| JP | 2002-140673 A | 5/2002 |
|---|---|---|
| JP | 2003-037240 A | 2/2003 |

(Continued)

*Primary Examiner* — Chun Cao
(74) *Attorney, Agent, or Firm* — Novick, Kim & Lee, PLLC; Sang Ho Lee

(57) ABSTRACT

Provided is a method for manufacturing a metal card which is capable of allowing metal card antennas to have no interference with a metal sheet by including a processed plastic layer formed on the metal sheet, and an insulating sheet. The metal card is capable of improving sensitivity of antenna coil, thereby solving an existing problem of the difficulties in performing RF communication because of material characteristics of a metal layer.

11 Claims, 13 Drawing Sheets

(56) References Cited

U.S. PATENT DOCUMENTS

| | | | |
|---|---|---|---|
| 2009/0200382 A1* | 8/2009 | Kwon | G06K 19/077 235/492 |
| 2015/0339564 A1* | 11/2015 | Herslow | B32B 13/04 235/488 |
| 2017/0308785 A1* | 10/2017 | Kim | G06K 19/07722 |

FOREIGN PATENT DOCUMENTS

| | | | |
|---|---|---|---|
| JP | 2003-159753 A | 6/2003 | |
| JP | 2016-051330 A | 4/2016 | |
| JP | 2017-524171 A | 8/2017 | |
| KR | 20-0314518 Y1 | 5/2003 | |
| KR | 10-2004-0079501 A | 9/2004 | |
| KR | 10-2004-0090835 A | 10/2004 | |
| KR | 20-0382725 Y1 | 4/2005 | |
| KR | 10-2011-0054454 A | 5/2011 | |
| KR | 10-1653702 B1 | 9/2016 | |
| KR | 10-2018-0020097 A | 2/2018 | |
| KR | 10-2018-0047356 A | 5/2018 | |
| KR | 10-2018-0077960 A | 7/2018 | |
| WO | 2017/007468 A1 | 1/2017 | |

* cited by examiner

METAL CARD AND METHOD FOR MANUFACTURING THE SAME

CROSS-REFERENCE TO RELATED APPLICATIONS

The present application is a continuation-in-part of international application No. PCT/KR2018/006929 filed on Jun. 19, 2018, and claims priority to Korean patent application No. 10-2018-0089627 filed on Jul. 31, 2018, and the entire contents of these prior-filed applications are hereby incorporated by reference.

TECHNICAL FIELD

The present disclosure relates to a metal card and a method for manufacturing the same, and more particularly, to a metal card and a method for manufacturing the same that are capable of allowing metal card antennas to have no interference with a metal sheet by including a processed plastic layer formed on the metal sheet, and an insulating sheet.

BACKGROUND ART

Generally, credit cards are used instead of cash, and as they are recently developed into smart cards in which IC chips for recording a large quantity of information are embedded, they are dynamically utilized as all kinds of membership cards as well as payment cards. In such smart card markets. Furthermore, specific cards made of various materials have been developed. Particularly, specialized credit cards made of metal materials have been provided for VIP customers, and as the metal cards have metallic luster, they have high-level outer appearances, so that they are provided for special customers.

In case of such conventional metal cards, however, at the time of contactless communication to a reader it is hard to operate antennas because of the characteristics of the metal, so that they are often limited in using an RF function, ATM, and so on. Further, the conventional metal cards are made of a thin film type metal sheet or a thin layer coated with metal powder, thereby making it difficult to print patterns and characters on their surface, and contrarily, if the metal cards are made of relatively lightweight materials, no weight is transferred from the metal to the metal cards. Accordingly, there is a need to develop a novel metal card capable of overcoming such limitations in use and expressing specific weight and beauty of the metal material.

A conventional metal thin film plastic card is disclosed in Korean Utility Model Registration No. 20-0382725, which includes a core sheet 13 made of a synthetic resin, metal thin films 12 attached to the top and bottom side of the core sheet 13 to a size smaller than the core sheet 13, margins 13a formed on the top and bottom side edges of the core sheet 13, and antenna coil 21 disposed along the margins 13a. In case of the conventional metal thin film plastic card, however, the metals are disposed on the center of the card to prevent the antenna coil from coming into contact therewith, thereby causing the whole outer appearance thereof to look bad and making it hard to express the metal texture on the surface of the card.

DISCLOSURE

Technical Problem

Accordingly, the present invention has been made in view of the above-mentioned problems occurring in the prior art, and it is an object of the present invention to provide a metal card and a method for manufacturing the same that are capable of improving sensitivity of antenna coil, thereby solving an existing problem that it is impossible to perform RF communication because of material characteristics of a metal layer.

Technical Solution

To accomplish the above-mentioned object, according to a first aspect of the present disclosure, there is provided a method for manufacturing a metal card including the steps of: preparing a metal sheet having a given size capable of accommodating a plurality of individual cards; heat treating the metal sheet made of a SUS material to improve strength and tension thereof; forming a processed layer insertion space on given areas of the bottom side of the metal sheet by means of CNC (Computerized Numerical Control) machining; inserting a processed layer made of a PVC plastic material into the processed layer insertion space; forming an exposure portion of processed layer by cutting top surface of the metal sheet to exposure the processed layer; forming a metal card sheet, by stacking, the metal sheet, a plurality of sheets having the same sizes as the metal sheet and including an adhesive sheet and an inlay sheet on which an antenna coil is printed, and laminating the metal sheet and the plurality of sheets on each other; producing an individual card having the processed layer, a metal layer formed from the metal sheet, and an inlay layer formed from the inlay sheet by cutting the metal card sheet along outlines of a plurality of individual cards including the individual card; forming a COB insertion area by performing a first milling process for the processed layer and the stacked sheets on the bottom side of the metal layer through the processed layer exposure portion of the individual card; connecting the antenna coil exposed through the first milling process with a contact portion formed on the rear surface of a COB pad; and mounting the COB pad connected with the antenna coil onto the COB insertion area of the metal layer. The COB insertion area is formed to accommodate the rear surface of the COB pad and to minimize a spare space except the space for connecting to the antenna coil.

To accomplish the above-mentioned object, according to a second aspect of the present disclosure, there is provided a metal card including: a metal sheet made of a SUS material and subjected to a heat treatment to improve strength and tension thereof; a processed layer made of a PVC plastic material and inserted into a processed layer insertion space formed on one side surface of the metal sheet by CNC (Computerized Numerical Control) machining; and a plurality of sheets stacked on the opposite side surface to the side surface of the metal sheet into which the processed layers are inserted as to be laminated onto each other, wherein the opposite side surface of the metal sheet is machined to form an exposure portion of processed layer for exposing a portion of the processed layer; the processed layers and the plurality of sheets are cut, through a first milling process for given areas of the processed layer exposure portions, to form a COB insertion area where an antenna coil of an inlay layer are exposed; and the COB insertion area is formed to accommodate a COB pad attached to the metal sheet after the antenna coil and the COB pad are connected to each other and to minimize a spare space except the space connected to the antenna coil.

Advantageous Effects

According to the present disclosure, the metal card manufacturing method is capable of efficiently connecting the antenna coil and the COB through the processed plastic layer, thereby enhancing the operational efficiency of the chip. According to the present disclosure, moreover, the metal card manufacturing method is carried out by directly connecting the antenna coil to the COB in the state where the antenna coil is not brought into contact with the metal sheet, thereby manufacturing the metal card capable of keeping the characteristics of the metal material and improving a contactless communication function. In detail, the COB and the antenna coil are directly connected to each other, while the front surface of the metal card is being made of the metal material, so that unlike the existing metal card, wireless communication sensitivity is improved and no interference between the metal material and the antenna coil occurs.

According to the present disclosure, also, the metal card manufacturing method is carried out by stacking the large-scale sheets capable of producing the plurality of cards and cutting the large-scale sheets to the unit of individual cards, thereby making the plurality of metal cards through one-time sheet process.

According to the present disclosure, further, the metal card manufacturing method is carried out by injecting cooled air into the surfaces of the stacked large-scale sheets inclusive of the metal sheet during the individual card outlines are cut along the surfaces of the stacked sheets, thereby stably cutting the individual card outlines.

According to the present disclosure, furthermore, the metal card manufacturing method is carried out by forming the holes on the large-scale sheets to prevent the large-scale sheets from being twisted in the process for cutting the large-scale sheets and by fixing the pins to the holes, so that the individual card outlines are cut, while the arranged states of the large-scale sheets are being maintained.

According to the present disclosure, in addition, the metal card manufacturing method is carried out with the insulating layer formed to a shape of a stable sheet for efficiently controlling magnetic interferences between the metal layer and the antenna coil performing contactless communication, thereby making the metal cards of which operational performance is improved in large quantities.

BRIEF DESCRIPTION OF DRAWINGS

FIGS. 13 and 14 are sectional views taken along the line A-A' of FIG. 12, wherein FIG. 13 shows the metal card sheet before cutting and after laminating and FIG. 14 shows the metal card sheet after cutting.

MODE FOR INVENTION

Figure 1:
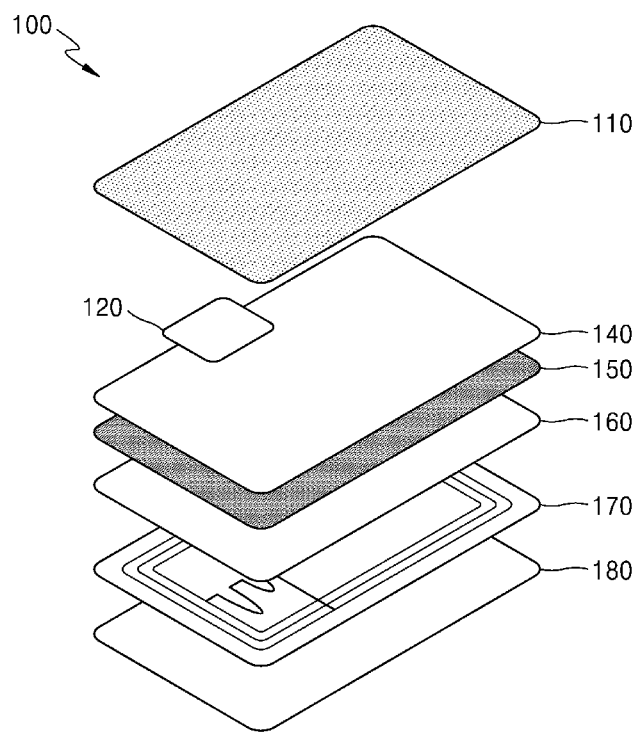
FIG. 1 is a perspective view showing a metal card according to an embodiment of the present disclosure.

Hereinafter, the present invention will be in detail given with reference to the attached drawing. If it is determined that the detailed explanation on the well-known technology related to the present invention makes the scope of the present invention not clear, the explanation will be avoided for the brevity of the description. In the description, it should be noted that the parts corresponding to those of the drawings are indicated by corresponding reference numerals.

In the description, when it is said that one element is described as being "connected" or "coupled" to the other element, one element may be directly connected or coupled to the other element, but it should be understood that another element may be present between the two elements. In the description, further, when it is said that one portion is described as "includes" any component, one element further may include other components unless no specific description is suggested.

Now, embodiments of the present invention will be described in detail below with reference to the accompanying drawings.

FIG. 1 is a perspective view showing a metal card 100 according to an embodiment of the present disclosure. The metal card 100 largely includes one or more sheets or layers. According to the present disclosure, the metal card 100 includes a metal layer 110, a processed layer 120 made of a plastic material, an insulating layer 150, one or more adhesive layers 140 and 160, an inlay layer 170, and a printed layer 180. In FIG. 1, the metal card 100 includes only the components as mentioned above, but it may further include a coated layer, a COB (Chip-On-Board), and other components, without being limited thereto. Furthermore, the metal card 100 may include a display and a biophysical sensor for implementing additional functions.

According to the present disclosure, further, the metal card 100 is manufactured to a given size and thickness according to predefined standards, and the sizes and thicknesses of the respective layers are determined optimizedly in consideration of the operation and wireless communication sensitivity of the metal card 100. Furthermore, the layers constituting the metal card 100 according to the present disclosure are not formed of sheets for making one card, but they are formed of large-scale sheets for making a plurality of cards so as to achieve mass production of the cards.

The metal layer 110 is a core sheet expressing a specific material and weight of the metal card of the present disclosure and is made of a SUS (Steel Use Stainless) material. The metal material constituting the metal layer 110 is selected in consideration of material and weight expressing the characteristics thereof as well as durability, abrasion, and deformation with which machining processes are resistant. According to the present disclosure, the metal layer 110 made of the SUS material is strong to corrosion and is thermally treatable. The heat treatment is a process in which a metal is heated to a given temperature in such a manner as to be improved to a metal having a given object or a metal tissue according to its cooling speed. The metal layer 110 has concave and convex portions on a portion of a surface thereof or on the entire surface thereof so as to improve its adhesion force. Moreover, the metal layer 110 is subjected to the heat treatment, at the time of making the metal card 100, so as to improve its strength and tension.

According to the present disclosure, the metal layer 100 is formed of a large-scale sheet with which a plurality of cards is made, and after a laminating process in which a plurality of sheets is made to one sheet through application of heat and pressure, a plurality of cards is produced from one sheet through cutting. A specified machining material, coolant, and cutting tool are used according to the characteristics of the metal material to perform the cutting and machining operations for a metal sheet 110s (See FIG. 13) with which the plurality of cards is made.

The processed layer 120 is a piece of a sheet made of a plastic material PVC and is located in a processed layer insertion space formed in the metal layer 110. The processed layer 120 serves as a device for attaching antenna coil of the inlay layer 170 to the COB in such a manner where the antenna coil are spaced apart from the metal layer 110 according to the characteristics of the metal card 100. The processed layer 120 made of the plastic material is located on a given portion of the metal layer 110 and is then processed, so that the COB can be efficiently connected to the antenna coil, while a direct contact between the metal layer 110 and the antenna coil is being avoided.

So as to avoid the contact between the metal layer 110 and the antenna coil, according to one existing metal card, the antenna coil is located on the plastic layer in such a manner as to indirectly communicate to the COB disposed on the metal layer. In case of another existing metal card, a portion of the metal layer is cut off to arrange and operate antenna coil thereon. However, such conventional metal cards cause the sensitivity of the antenna coil to be deteriorated and provide bad outer appearances.

So as to solve such problems, the metal card 100 according to the present disclosure is configured to locate the processed layer 120 in the processed layer insertion space of the metal layer 110, so that the antenna coil is brought into direct contact with the COB, while being spaced apart from the metal layer 110 through the processed layer 120. If the antenna coil is brought into direct contact with the COB, like this, the sensitivity of the antenna coil is improved by means of the wireless connection between the antenna coil and the chip (COB) in the metal card, thereby enhancing a wireless communication function, and the entire surface of the metal card is formed with the metal material, thereby providing a high level outer appearance. Unlike wireless connection, also, the COB is mounted, without any need to form a separate spare space for the wireless communication, thereby improving durability and stability of the metal card.

The insulating layer 150 serves to block an interference with the metal layer 110 so as to allow the antenna coil of the inlay layer 170 to be operable. So as to allow NFC antenna coil to operate, the NFC antenna coil have to communicate to the opposite side antenna reader thereto, and in this case, a magnetic field is generated from the antenna coil, and the antenna coil to be attached to the rear surface of the metal card so that the antenna coil may be close to the metal material of the metal layer. In this case, the metal material of the metal layer changes SRF (self-resonant frequency) of the antennal coil to increase loss, so that the inductance of the antenna coil becomes lowered to cause communication troubles. This is because of eddy (eddy current) generated from the metal material by means of the magnetic field, and so as to remove the eddy, a high permeability and high resistance material is located between the metal and the antenna coil to adjust magnetic field lines. To do this, the insulating layer 150 is used, which is called a ferrite sheet. The ferrite is made by making iron to a form of powder, oxidizing and insulating the outer surface of the powder, and applying a pressure to make the powder to a given shape.

Figure 13:
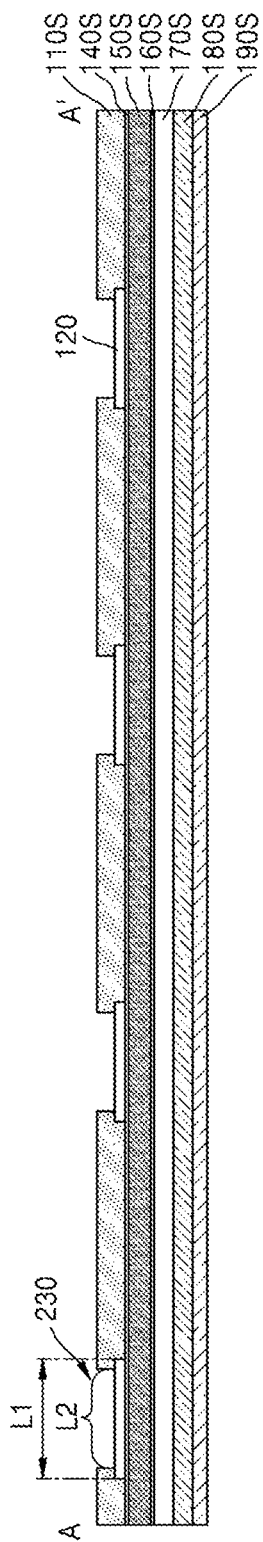

The insulating layer 150 and the metal layer 110 are bonded to each other by means of the adhesive layers 140 and 160. According to the present disclosure, the adhesive layers 140 and 160 are hot melt layers. In FIG. 1, the adhesive layers 140 and 160 for one metal card 100 are shown, but as shown in FIG. 13, they are formed of large-scale adhesive sheets 140s and 160s with which a plurality of cards are produced at the time of card manufacturing. A hot melt material is melted by means of heating, and if a material like a thermoplastic resin is heated, melted and cooled, it becomes solidified. Accordingly, the thermoplastic resin material can be used as a film type hot melt adhesive. According to the present disclosure, the hot melt adhesive layers 140 and 160 are adhesive layers for bonding the metal layer 110 made of the metal material and the insulating layer 150, and unlike the adhesive used for the plastic sheet, the hot melt adhesive layers 140 and 160 are adequate for the metal layer 110 made of the metal material. The inlay layer 170 is a sheet having the RF antenna coil, and the number of turns of the antenna coil in the inlay layer 170 is determined to express optimized sensitivity through an RF communication (for example, NFC) sensitivity test. According to the present disclosure, further, the antenna coil is directly connected to the COB attached to the metal layer 110 through the processed layer 120.

The printed layer 180 is a sheet on which card information is printed and displayed, which is attached to the rear surface of the metal card 100. After the processed layer 120 is attached to the metal layer 110 through a first machining process (for example, CNC (Computerized Numerical Control) machining process for forming the processed layer insertion space) of the metal layer 110, the layers 110, 140, 150, 150, 170 and 180 are stacked and bonded to one another through a laminating process to one metal card body.

Figure 2:
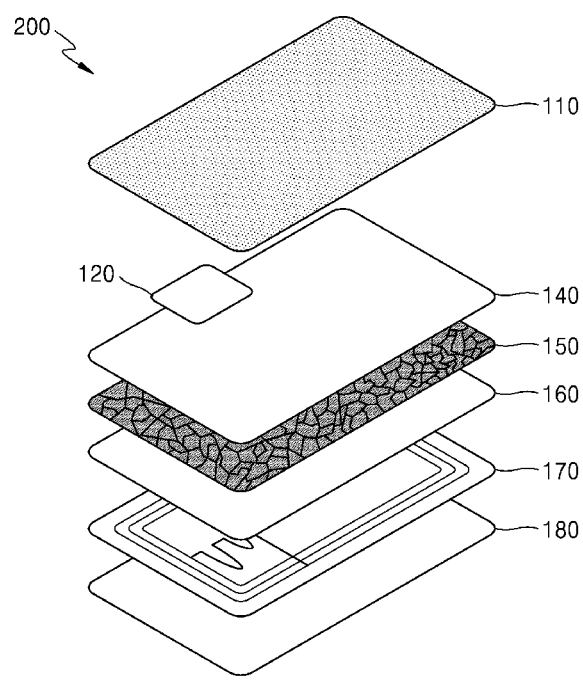
FIG. 2 is a perspective view showing a metal card according to another embodiment of the present disclosure.

FIG. 2 is a perspective view showing a metal card 200 according to another embodiment of the present disclosure. The metal card 200 largely includes one or more sheets or layers. According to the present disclosure, in the same manner as shown in FIG. 1, the metal card 200 includes a metal layer 110, a processed layer 120 made of a plastic material, an insulating layer 150, one or more adhesive layers 140 and 160, an inlay layer 170, and a printed layer 180. The metal card 200 may include a display and a biophysical sensor for implementing additional functions.

According to the present disclosure, the insulating layer 150 of the metal card 200 is formed of one or more broken pieces. For example, the insulating layer 150 is made of non-uniform or uniform broken pieces. Like this, if the insulating layer 150 is formed of the broken pieces, the hot melt adhesive is melted to flow to gaps between the pieces of the insulating layer 150 at the time when the insulating layer 150 is attached to the adhesive layers, so that the adhesion force of the insulating layer 150 to the adhesive layers can be improved.

Figure 3:
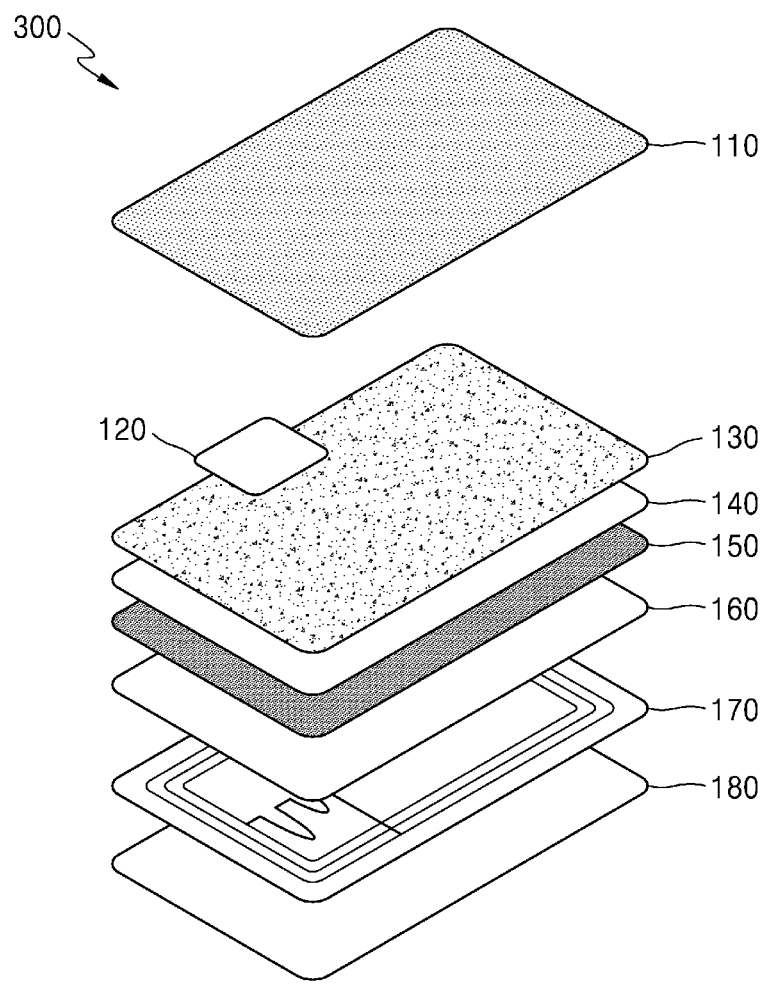
FIG. 3 is a perspective view showing a metal card according to yet another embodiment of the present disclosure.

FIG. 3 is a perspective view showing a metal card 300 according to yet another embodiment of the present disclosure. The metal card 300 further includes a powder type ferrite layer 130.

The ferrite is a ferromagnetic insulating material, and if the ferrite is powdered, an adhesion force is improved, so that in addition to the insulating layer 150, another insulating layer 130 is provided to upgrade insulating functions between the metal layer 110 and other layers. According to the present disclosure, the ferrite is powdered, but of course, it may be made to the form of a net or amorphous powder, without being limited thereto. Since the ferrite is such ferromagnetic insulating material, the ferrite layer is added to strength the insulating characteristics of the bottom side of the metal layer 110, thereby ensuring normal antenna operations in the metal card 300.

Hereinafter, an explanation on a method for machining the metal layer 110 and the processed layer 120 of the metal card according to the present disclosure will be in more detail given with reference to FIGS. 4A to 6C.

Figure 4A:
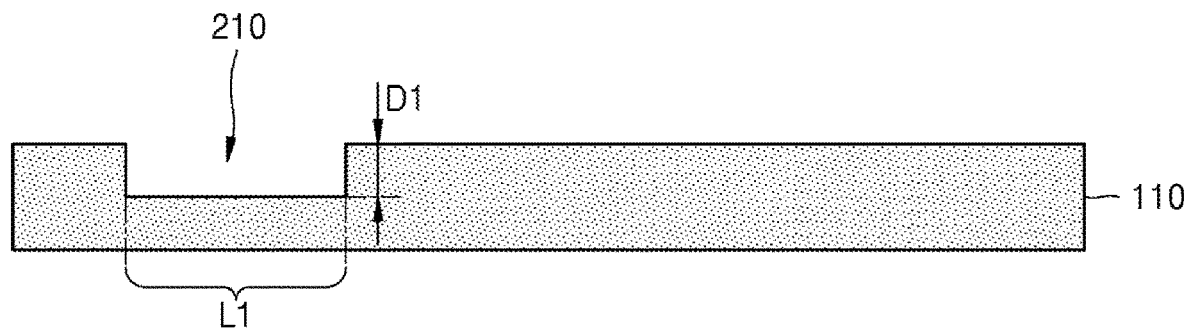
FIGS. 4A to 4C are sectional views showing a method for manufacturing a metal card according to an embodiment of the present disclosure.

FIGS. 4A to 5C are sectional views showing a method for manufacturing the metal card according to an embodiment of the present disclosure. FIGS. 4A to 4C show a method for machining the metal layer 110 to attach the processed layer 120 to the metal layer 110. As shown in FIG. 4A, first, a processed layer insertion space 210 (for example, having a width L1 and a depth D1) into which the processed layer 120 is insertable is formed in the metal layer 110. According to the present disclosure, the processed layer insertion space 210 is formed through CNC machining.

Figure 4B:
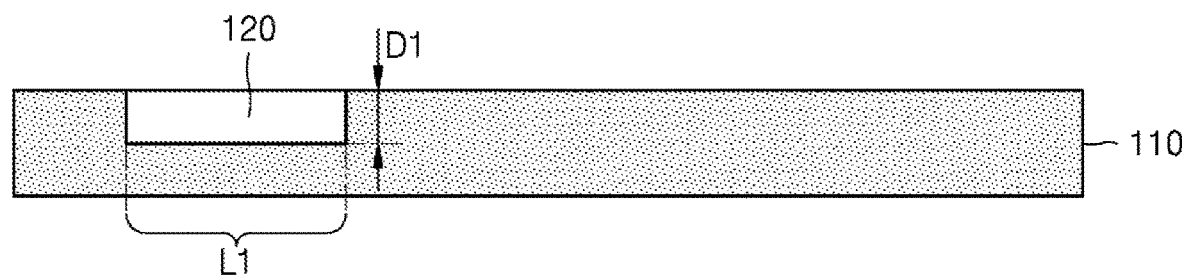

Next, as shown in FIG. 4B, the processed layer 120 made of the PVC material is inserted into the processed layer insertion space 210 of the metal layer 110. At this time, the processed layer 120 is inserted, without any separate adhesive. After that, the opposite side metal layer 110 to the processed layer 120 is machined to form a processed layer exposure portion 230 from which the processed layer 120 is exposed. At this time, a width L2 of the processed layer exposure portion 230 has to be shorter than the width L1 of the processed layer insertion space 210. This is to prevent the processed layer 120 from being separated from the metal layer 110 at the time when the metal layer 110 turns over later.

Figure 5A:
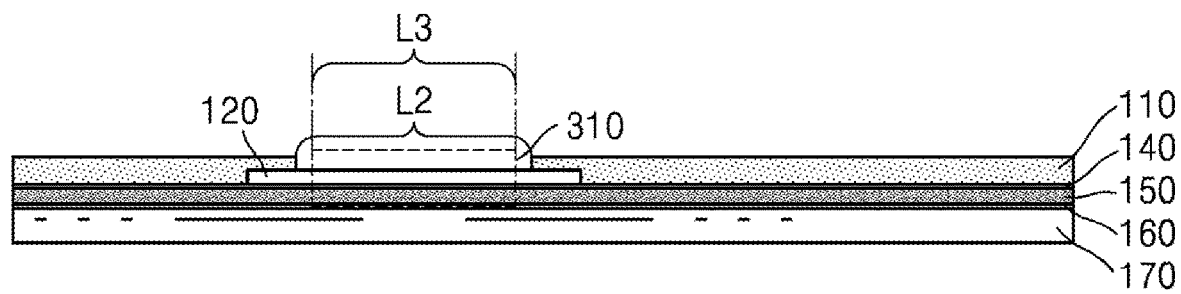
FIGS. 5A to 5C are sectional views showing the method for manufacturing a metal card according to the present disclosure, wherein processes are subsequent from the processes of FIGS. 4A to 4C.
Figure 5B:
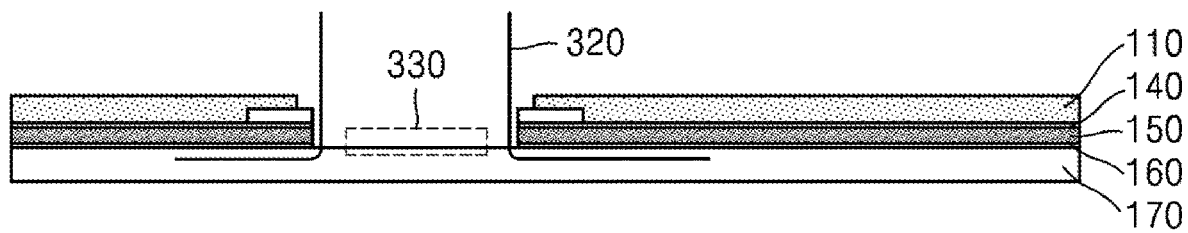
Figure 5C:
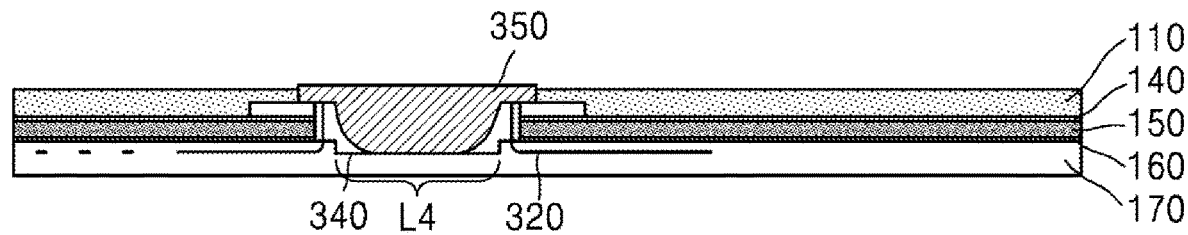

FIGS. 5A to 5C show a second machining process for the processed layer 120 after the processed layer 120 has been inserted into the metal layer 110 and laminated onto the layers 140 to 170. According to the present disclosure, the processed layer 120 made of the PVC is mounted into the metal layer 110, and after that, the metal layer 110, the adhesive layer 140, the insulating layer 150, the adhesive layer 160, and the inlay layer 170 are laminated on each other. Even through not shown in the drawings, a printed sheet, a magnetic strip MS, and an overlay sheet may be laminatedly bonded to the rear surface of the inlay layer 170.

The card body is made to the form of one plate through the laminating process with heat and pressure, which is shown in FIG. 5A. The metal layer 110 located on the uppermost layer of the metal card is provided with the processed layer exposure portion 230 having the width L2. In this state, second CNC machining is carried out. As shown in FIG. 5A, the layers are machined up to the inlay layer 170 to a width L3 to form an insertion space 310. At this time, the layers are finely machined to the width L3 until the antenna coil 320 of the inlay layer 170 are exposed. If the antenna coil 320 of the inlay layer 170 are exposed, as shown in FIG. 5B, the antenna coil 320 are lifted upward. Even at this time, the sides of the processed layer 120 are exposed by the insertion space 310, so that since the antenna coil 320 is just exposed to the sides of the adhesive layers 140 and 160, the insulating layer 150, and the processed layer 120, they do not come into direct contact with the metal layer 110. Through such machining, the antenna coil do not come into direct contact with the metal material.

Next, as shown in FIG. 5B, the processed layer exposure portion 230 is machined one more time to form a given space 330 for accommodating the rear surface of the COB 350 and to achieve flattening on the front surface of the metal card. In this case, the inlay layer 170 is machined to a width L4 to insert a protruding portion from the rear surface of the COB 350. At this time, the width L4 is shorter than the width L3. If the second milling for the insertion of the COB 350 is finished, as shown in FIG. 5C, an accommodation recess 340 is formed to insert the COB 350. After that, the antenna coil 320 lifted upward is connected with the contact point of the COB 350 by means of spot welding, and the COB 350 is mounted on the metal layer 110. If so, the protruding portion from the rear surface of the COB 350 is inserted into the accommodation recess 340. At this time, an adhesive is applied to an area on which the rear surface of the COB 350 comes into contact with the processed layer 120 to fix the COB 350 to the processed layer 120.

According to the present disclosure, the COB insertion process may be carried out after the front surface of the metal card has been printed and coated. According to the present disclosure, further, the accommodation recess 340 has a shape of a square, but it may have a shape corresponding to the protruding portion from the rear surface of the COB 350, while minimizing a spare space except the space for connecting the antenna coil, without being limited thereto. According to the present disclosure, the antenna coil 320 connected to the rear surface of the COB 350 are spaced apart from the processed layer 120, the insulating layer 150, and the adhesive layers 140 and 160 laminated on each other, by a given distance, in such a manner as to be not directly contacted with them.

Figure 6A:
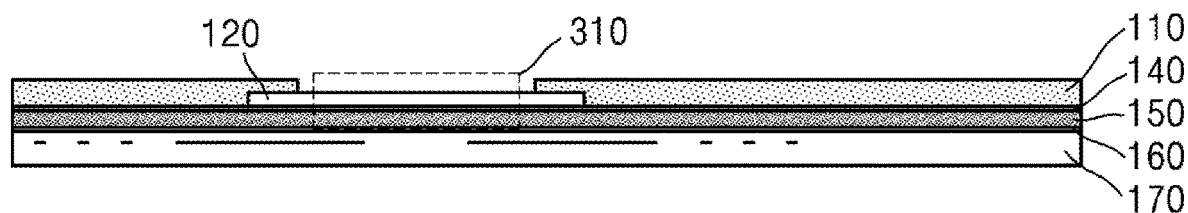
FIGS. 6A to 6C are sectional views showing the method for manufacturing a metal card according to another embodiment of the present disclosure, wherein processes are subsequent from the processes of FIGS. 4A to 4C.
Figure 6B:
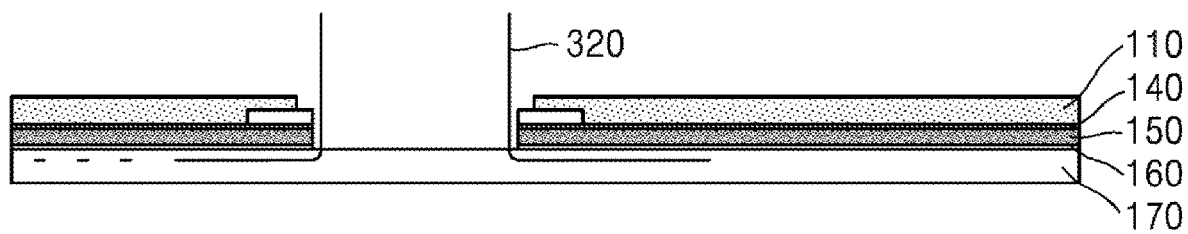
Figure 6C:
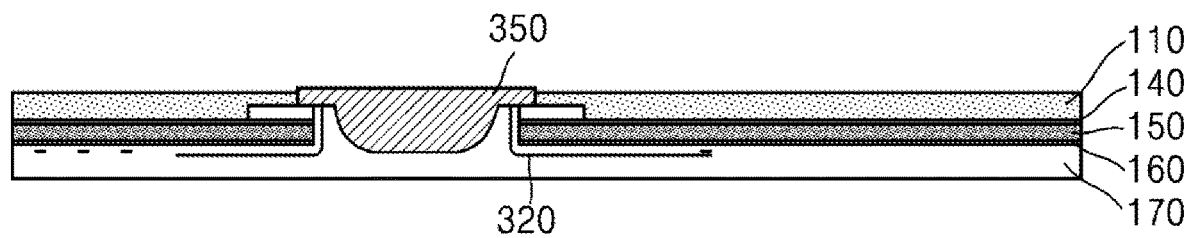

FIGS. 6A to 6C show another COB insertion process according to the present disclosure. In FIGS. 5A to 5C, the accommodation recess 340 is formed correspondingly to the protruding portion from the rear surface of the COB 350, but without any separate milling for the accommodation recess 340, the COB 350 connected to the antenna coil 320 may be inserted onto the processed layer 120. As shown in FIGS. 6A to 6C, the thicknesses of the layers are magnified for the clarity and convenience of the description, but the layers have substantially low thicknesses. Further, the protruding portion from the rear surface of the COB 350 has a depth of 1 mm or under. If it is not necessary to form the accommodation recess 340, like this, the process for forming the accommodation recess 340 is removed, and after the antenna coil 320 is connected to the contact points of the rear surface of the COB 350, the COB 350 is mounted into the processed layer 120.

In FIGS. 5A to 6C, the COB insertion area is formed by means of milling, but it may be not limited thereto. In detail, an acid resistant anticorrosive is applied to the entire portion except the position to which the COB 350 is attached, and the metal layer 110 is submerged into diluted acid in such a manner as to corrode by means of etching to have a hole having a size of a COB pad pierced thereinto. After that, the COB 350 is attached to the hole. In more detail, the acid resistant anticorrosive is coated on the entire portion of the metal layer 110 of the SUS material except the position into which the COB pad is inserted. In this case, the acid resistant anticorrosive includes an etching ground made by mixing beeswax, pitch, rosin and so on. The metal layer 110 coated with the acid resistant anticorrosive is submerged into a tank in which the diluted acid is stored and thus corrodes to piercedly form the hole for inserting the COB 350. In the corrosion process, at this time, fine convex and concave portions are formed on the hole, so that the COB pad is attached very firmly to the hole. In addition thereto, such etching technique is applicable to the process for forming the processed layer exposure portion.

Figure 7:
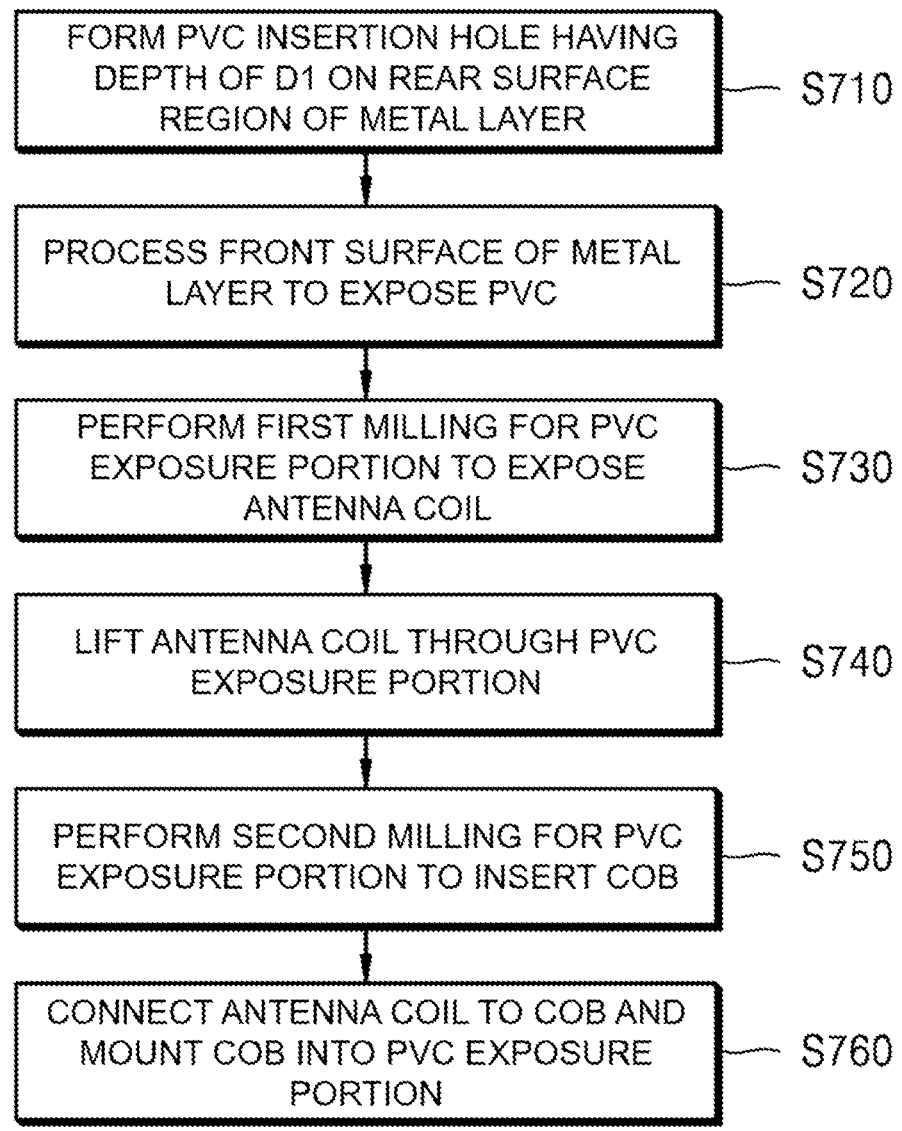
FIG. 7 is a flowchart showing the method for manufacturing a metal card according to the present disclosure.
Figure 14:
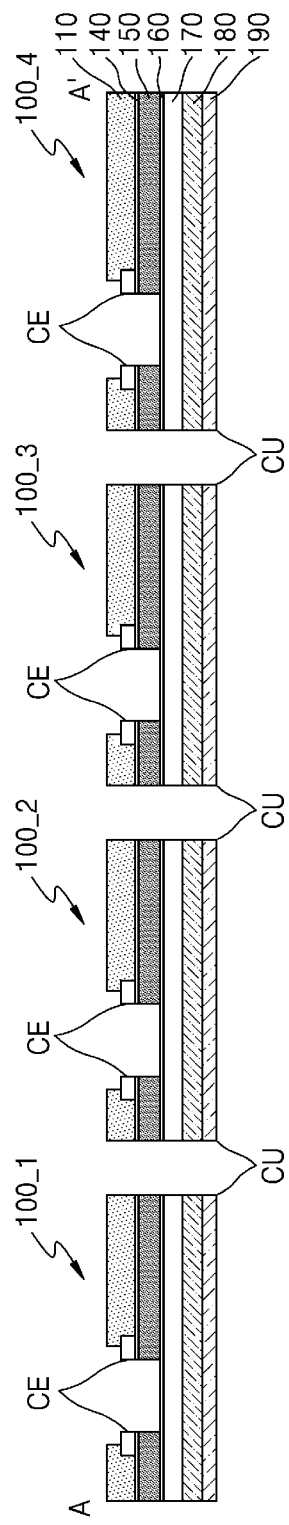

FIG. 7 is a flowchart showing the method for manufacturing a metal card according to the present disclosure. In the method for manufacturing the metal card according to the present disclosure, as shown in FIG. 7, the processes for forming the processed layer 120 on the metal layer 110 and mounting the COB 350 onto the metal layer 110 will be especially explained. As mentioned above, the laminating structure of the individual card has been explained, but as shown in FIGS. 13 and 14, the metal sheet, the adhesive sheets, the insulating sheet, and the inlay sheet are laminated on each other to the form of large-scale sheets.

First, the metal layer 110 is subjected to a heat treatment according to the characteristics of the SUS material, and if so, the tension and strength of the metal layer 110 are improved, thereby being efficient in milling the metal card. If the metal layer 110 is made of the SUS material, it has concave and convex portions on a portion of a surface thereof, thereby providing excellent adhesion force. Contrarily, if the metal layer 110 is formed of an aluminum sheet, the aluminum sheet is polished by aluminum oxide or roughly treated by means of sand blasting to form an oxide treated layer, so that the adhesion force of the aluminum sheet can be improved.

According to the present disclosure, a process for applying a color to the metal layer 110 may be carried out. For example, if it is desired that the metal layer 110 still has its raw material color (silver color), the color application process is removed. If it is desired to apply a given color to the metal layer 110, however, the color application process is carried out by means of deposition through which particles are attached to the metal layer 110 under a magnetic field. In detail, a thin film type deposition layer formed of particles expressing the given color is formed on the surface of the metal layer 110, thereby applying the given color to the metal layer 110.

According to the present disclosure, on the other hand, if it is desired to form a given pattern on the metal layer 110, the pattern is formed with UV ink by means of digital printing. After the pattern printing onto the metal layer 110 with the UV ink has been carried out, the printed pattern is hardened through the exposure to UV rays. According to the present disclosure, like this, the color application to the front surface of the metal layer 110 is carried out by means of the deposition, and the operation for printing given patterns, characters or numbers is carried out with the UV ink. In this case, if the UV ink treatment is carried out for the entire area of the metal layer 110, the strength of the metal card becomes decreased, and further, since the UV ink treatment is carried out for the respective cards, individually, the UV ink treatment for the entire area of the metal layer 110 is not adequate for mass production.

According to the present disclosure, further, at the time when UV ink printing is carried out to form a three-dimensional pattern on the metal layer 110, transparent UV ink is applied to a high thickness layer to form the three-dimensional pattern. In detail, the transparent UV ink layer is formed to a high thickness in such a manner as to protrude from the metal layer 110, thereby producing three-dimensional feeling. Instead of the transparent UV ink, of course, a given color ink may be applied to form the three-dimensional pattern on the metal layer 110.

If the treatments on the metal layer 110 itself are finished, the processed layer insertion space 210 is formed on one surface (for example, the rear surface) of the metal layer 110 (at step S710). The processed layer insertion space 210 serves to insert the processed layer 120 made of the PVC material, which is also called PVC insertion space. According to the present disclosure, the depth of the processed layer insertion space 210 is ½ of the thickness of the entire metal card. In detail, the depth D1 of the processed layer insertion space 210 is ½ of the thickness D of the metal card. The processed layer insertion space 210 has a shape of a square having the length L1 larger than a length of one surface of the COB. If the formation of the processed layer insertion space 210 is finished, the processed layer 120 is inserted into the processed layer insertion space 210.

Next, the other surface (for example, the front surface) of the metal layer 110 is machined to form the processed layer exposure portion 230 (See FIG. 4) from which the processed layer 120 is exposed (at step S720). At this time, the machined area has a shape of a square having the length L2 shorter than the length L1 of one side of the processed layer insertion space 210 (L2<L1). This is to prevent the processed layer 120 inserted into the processed layer insertion space 210 from being separated from the metal layer 110. As mentioned above, the processed layer 120 is mounted onto the metal layer 110 and then laminatedly bonded to other layers by means of the heat and pressure. After the laminating process, the metal layer 110, the processed layer 120, the adhesive layers 140 and 160, the insulating layer 150, the inlay layer 170 and the printed layer 180 are formed to one card body (See FIG. 5A).

According to the present disclosure, the laminating process is carried out at a low temperature and a low pressure, and the treatment time is shorter than that in a plastic card. For example, the time of the laminating process and heat treatment conditions such as temperature, pressure, and so on are determined in consideration of an adhesion force, a thickness of the metal layer, and a degree of deformation of the processed layer. If the thickness of the metal layer is high, the temperature for the laminating process is raised. Further, the processed layer made of the PVC material is more easily contracted or extended than the metal layer, and accordingly, the laminating time and temperature can be determined in consideration of the degree of deformation (contraction and extension) of the PVC material at the time of the laminating process.

Through the first milling process on the laminated layers, the antenna coil 320 is lifted from the inlay layer 170 (at steps S730 and S740). As mentioned with reference to FIG. 5A, the first milling process is carried out to place the processed layer 120 to be exposedly in an up direction with respect to other layers bonded to the metal layer 110 on which the processed layer 120 is mounted. In detail, the metal layer 110 is located on the uppermost position, and in the state where the processed layer 120 made of the PVC material is exposed through the processed layer exposure portion 230 having the length L2, the layers are machined up to the inlay layer 170 through the first milling process. At this time, the machined area has a shape of a square (or circle) having one side length L3 shorter than the length L2 (L3<L2). Since the layers are machined to the area having the length L3 shorter than the length L2, the metal layer 110 can be spaced apart from the COB insertion space 310 through the first milling process. As the given distance between the metal layer 110 and the COB insertion space 310 is formed, the antenna coil 320 does not come into contact with the metal layer 110 even though they are lifted upward.

Next, as shown in FIGS. 5A to 5C, the second milling process is carried out to insert the COB 350, and in the second milling process, the COB insertion space 310 is machined one more time to form the accommodation recess 340 (at step S750). According to the present disclosure, the second milling process is explained as mentioned with reference to FIGS. 5A to 5C, but as shown in FIGS. 6A to 6C, if it is possible to insert the COB 350, without any additional milling process, the second milling process (the step S750) is removed.

According to the present disclosure, the second milling process is carried out before primer application, printing and coating of the front surface of the metal card, and otherwise, it may be carried out after the primer application, printing and coating of the front surface of the metal card. In this case, the COB to which a semiconductor for a smart card is attached is assembled to an information transmission and near field communication package. The second milling process is carried out to form the space for accommodating the area protruding from the rear surface of the COB, so that a portion of the open portion of the inlay layer 170 is machined to the accommodation space 340 (for example, to a shape of a square having one side length L4) having the length L4 and a depth D4 (See FIG. 5C). According to the present disclosure, the second milling process is carried out to have the accommodation space 340 having the shape of the square, but of course, it may be carried out to a shape corresponding to the protruding portion from the rear surface of the COB, without being limited thereto. In detail, the second milling process is carried out to have the accommodation space 340 for accommodating the protruding portion from the rear surface of the COB, while minimizing an empty space therein. At this time, a space for connecting the rear surface of the COB and the antenna coil 320 may be separately formed. To do this, one or more contact points (contact portions) to be connected to the antenna coil 320 are formed on the rear surface of the COB, and the antenna coil 320 lifted upward through the COB insertion space 310 is directly connected to the contact point of the rear surface of the COB.

According to the present disclosure, as shown in FIGS. 5A and 6B, the two antenna coils 320 lifted upward are connected correspondingly to the contact points of the rear surface of the COB pad, and after that, the COB pad is inserted into the COB insertion space 310 of the metal layer 110. At this time, an adhesive or adhesion sheet is added to the rear surface of the COB pad, and then, the COB pad is fixedly inserted into the COB insertion space 310 of the metal layer 110.

Through such process, the antenna coil 320 is connected directly to the COB in the state of being not brought into direct contact with the metal layer 110, thereby making the metal card capable of keeping the characteristics of the metal material and improving a contactless communication function with no interference and distortion. In detail, the COB and the antenna coil are directly connected to each other, while the front surface of the metal card is being made of the metal material, so that unlike the existing metal card, the wireless communication sensitivity is improved and no interference between the metal material and the antenna coil occurs.

Figure 8:
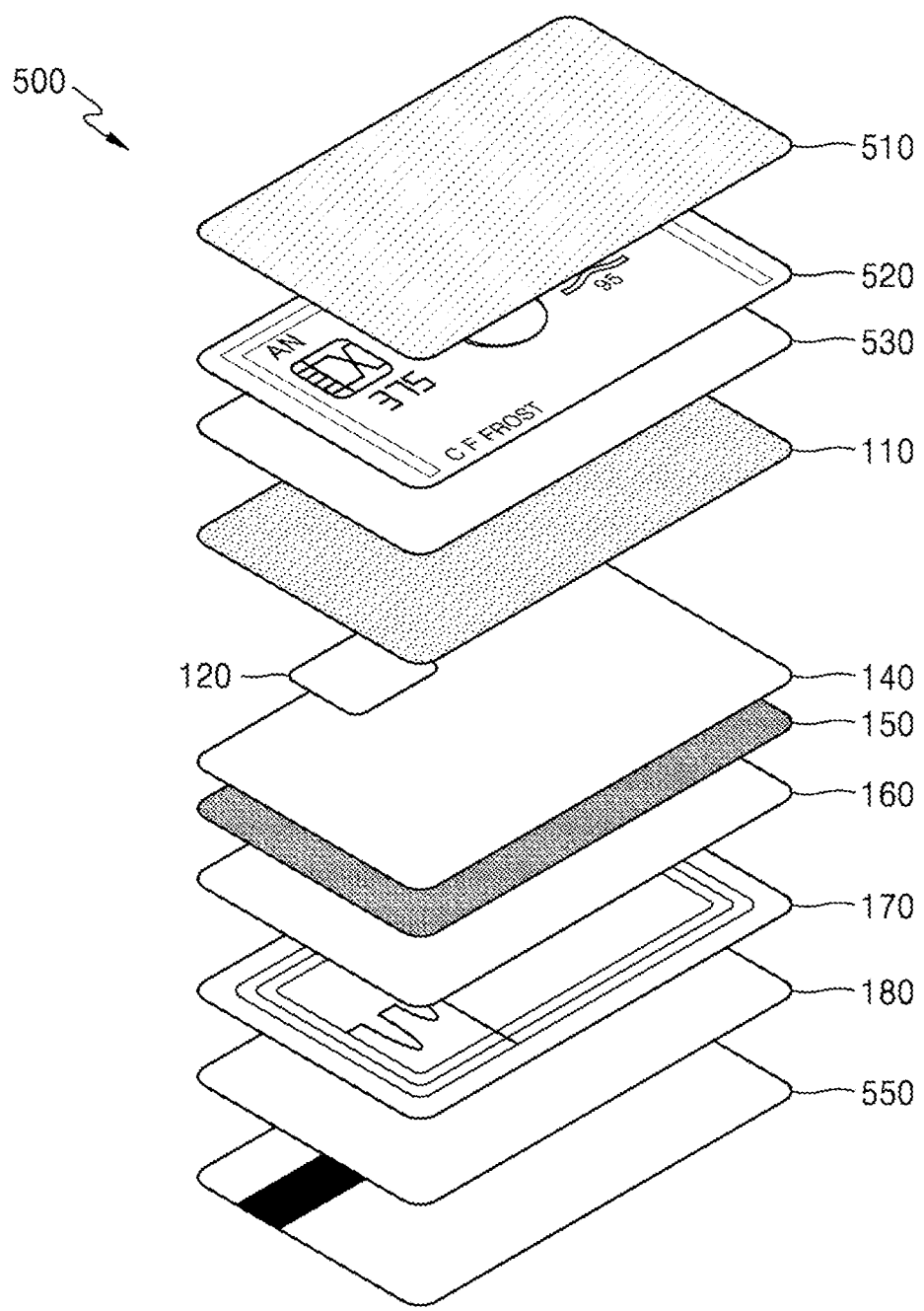
FIG. 8 is a perspective view showing a metal card according to still another embodiment of the present disclosure.

FIG. 8 is a perspective view showing a metal card 500 according to still another embodiment of the present disclosure. According to the present disclosure, the metal card 500 is configured to additionally form a primer layer 530, a three-dimensional printed layer 520, and a coated layer 520 onto the metal card body machined through the processed layer 120. Even though not shown in the figure, a C-cut process for grinding the corners of the card and a stamping process for attaching a signal panel and a hologram to the rear surface of the card may be carried out additionally to make the metal card 500.

As described above, the metal card 500 includes one or more sheets or layers. According to the present disclosure, the metal card 500 includes a metal layer 110, a processed layer 120 made of a plastic material, an insulating layer 150, one or more adhesive layers 140 and 160, an inlay layer 170, a printed layer 180, and a magnetic strip overlay layer 550. In FIG. 8, the metal card 500 includes only the components as mentioned above, but it may further include a COB, a biophysical sensor, a display, and other components, without being limited thereto. According to the present disclosure, further, the metal card 500 is manufactured to a given size and thickness according to predefined standards, and the sizes and thicknesses of the respective layers are determined optimizely in consideration of the operation and wireless communication sensitivity of the metal card.

Furthermore, the layers constituting the metal card 500 according to the present disclosure are not formed of sheets for making one card, but they are formed of large-scale sheets for making a plurality of cards so as to achieve mass production of the cards. First, the layers are laminated on each other and cut away, thereby making the plurality of cards. So as to perform the cutting process of the metal layer 110, a specified machining material, coolant, and cutting tool are used according to the characteristics of the metal material. An explanation on a mass production process of the metal card will be in detail given later with reference to FIGS. 9 to 15. As shown in FIG. 8, the metal layer 110 of the metal card 500 is a core sheet expressing a specific material and weight of the metal card of the present disclosure and is made of a SUS (Steel Use Stainless) material. The metal materials constituting the metal layer 110 are selected in consideration of the material and weight expressing the characteristics thereof as well as durability, abrasion, and deformation with which machining processes are resistant. In the same manner as mentioned in FIG. 7, the metal layer 110 is subjected to a heat treatment so as to improve its strength and tension and is also subjected to a color deposition process for applying a color and a UV ink digital printing process for forming a given pattern.

The processed layer 120 is a piece of sheet made of a plastic material PVC having a given thickness and size and is disposed in a processed layer insertion space 210 (See FIG. 4) of the metal layer 110. The processed layer 120 serves as a device for attaching antenna coil of the inlay layer 170 to the COB in such a manner as to be spaced apart from the metal layer 110 according to the characteristics of the metal card 100. The processed layer 120 made of the plastic material is located on a given portion of the metal layer 110 and machined, so that the COB can be efficiently connected to the antenna coil, while a direct contact between the metal layer 110 and the antenna coil is being avoided.

The insulating layer 150 serves to block an interference with the metal layer 110 so as to allow the antenna coil of the inlay layer 170 to be operable. So as to remove eddy, a high permeability and high resistance material is located between the metal and the antenna coil to adjust magnetic field lines. To do this, a ferrite sheet is used as the insulating layer 150. The insulating layer 150 and the metal layer 110 are bonded to each other by means of the adhesive layers 140 and 160. According to the present disclosure, the adhesive layers 140 and 160 are hot melt layers. A hot melt material is melted by means of heating, and if a material like a thermoplastic resin is heated, melted and cooled, it becomes solidified. Accordingly, the thermoplastic resin material can be used as a film type hot melt adhesive.

The inlay layer 170 is a sheet having the RF antenna coil, and the number of turns of the antenna coils in the inlay layer 170 is determined to express optimized sensitivity through an RF communication (for example, NFC) sensitivity test. According to the present disclosure, further, the antenna coil is directly connected to the COB attached to the metal layer 110 through the processed layer 120.

The printed layer 180 is a sheet on which card information or an image like a pattern is printed and displayed, which is attached to the rear surface of the metal card 100. The magnetic strip overlay layer 550 is a sheet on which a magnetic strip is located.

The respective layers are bonded and laminated on each other with heat and pressure to the form of one card body according to a predetermined way. After that, the large-scale sheet formed of one integrated sheet is cut off through a CNC cutting tool, thereby producing individual cards therefrom.

Next, the cards separated as individual cards are subjected to a primer application process, a 3-D printing process, and a coating process. According to the present disclosure, the laminatedly integrated sheets are separated as one card through the CNC cutting process, and the primer is applied to the separated cards. At this time, the primer serves as a material for improving the preservation force of the printed information according to the material of the metal layer. For example, the primer application process is carried out at a temperature of 80° C. for 30 minutes.

Next, card information, pattern, and picture image are formed engravedly on the metal layer onto which the primer is coated through the 3-D printing process. After that, the coating process is carried out to form a coated layer 510 on the uppermost surface of the metal card, so that the information formed through the 3-D printing process is not abraded or removed. For example, the coating process is carried out at a temperature of 80° C. for 30 minutes.

As mentioned above, the second milling process is carried out before the primer application process and the printing process so as to insert the COB, and so as to prevent the COB from being contaminated by the primer or coating material, otherwise, the second milling process may be carried out before the insertion of the COB after the formation of the coated layer. According to the present disclosure, since the entire surface of the metal layer 110 is formed of the metal material through the primer layer 530, the three-dimensional printed layer 520, and the coated layer 520, a high-level outer appearance of the metal card is expressed, while providing the card information. Also, the processed layer 120 made of the plastic material is insertedly located on the metal layer 110, and the antenna coil is connected directly to the COB through the processed layer 120, without any contact with the metal layer 110. Through the method for manufacturing the metal card, the entire surface of the card is formed of the metal material, while the sensitivity of the antenna coil is being improved, thereby keeping the high-level outer appearance of the metal card and improving the wireless communication function.

Figure 9:
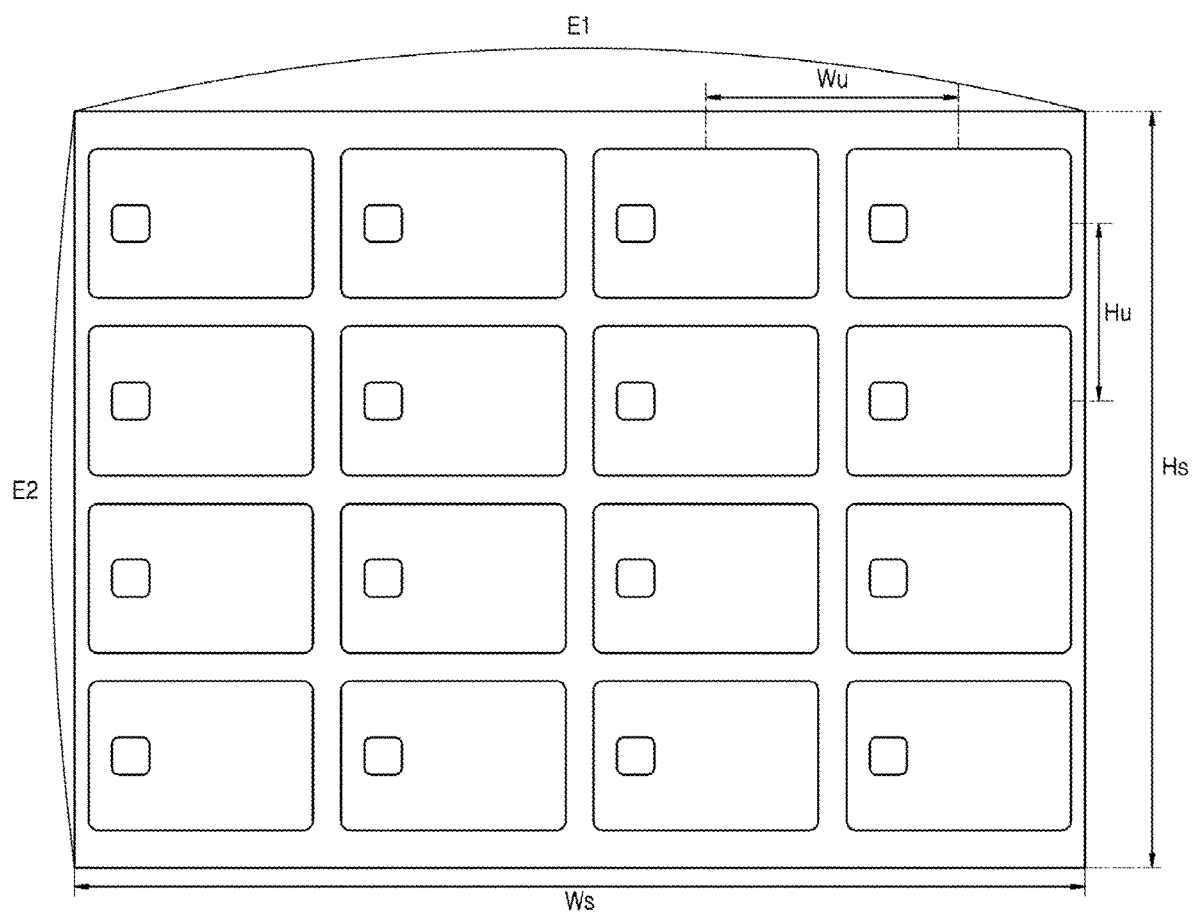
FIG. 9 is a top view showing arrangements of individual metal cards on large-scale sheets for manufacturing the metal card according to the present disclosure.

FIG. 9 is a top view showing arrangements of individual metal cards on the large-scale sheet for manufacturing the metal cards according to the present disclosure. In FIG. 9, the cards are arranged along individual card outlines to be cut off after the respective layers have been laminated on each other, so as to make the individual cards. Such individual card outlines may be not indicated on the sheet used in the real manufacturing process, and also, the individual card outlines to be cut off through the CNC process are designated by means of a controller of a card manufacturing apparatus. According to the present disclosure, the respective layers may have the same width and height as each other.

The sheet for making the metal cards according to the present disclosure has a shape of a rectangle having a longitudinal edge E1 and a transverse edge E2. The longitudinal edge E1 has a size of a sheet width Ws and the transverse edge E2 has a size of a sheet height Hs. In the sheet, the individual cards are arranged with a card unit width Wu and a card unit height Hu.

For example, the sheet width Ws is 400 mm, the sheet height Hs is 300 mm, the card unit width Wu is 99 mm, and the card unit height Hu is 67.4 mm. The widths and heights are determined based on the size of the metal card 100 and the spare space required in the cutting process of the individual cards through the cutting tool.

According to the present disclosure, there is needing to fixedly arrange the plurality of sheets after the plurality of sheets as shown in FIG. 1 have been laminatedly bonded so as to make the metal cards through the cutting process. In this case, holes are formed on the respective sheets. The holes formed on the sheets are fixed by pins, so that the sheets can be fixedly arranged.

Figure 10:
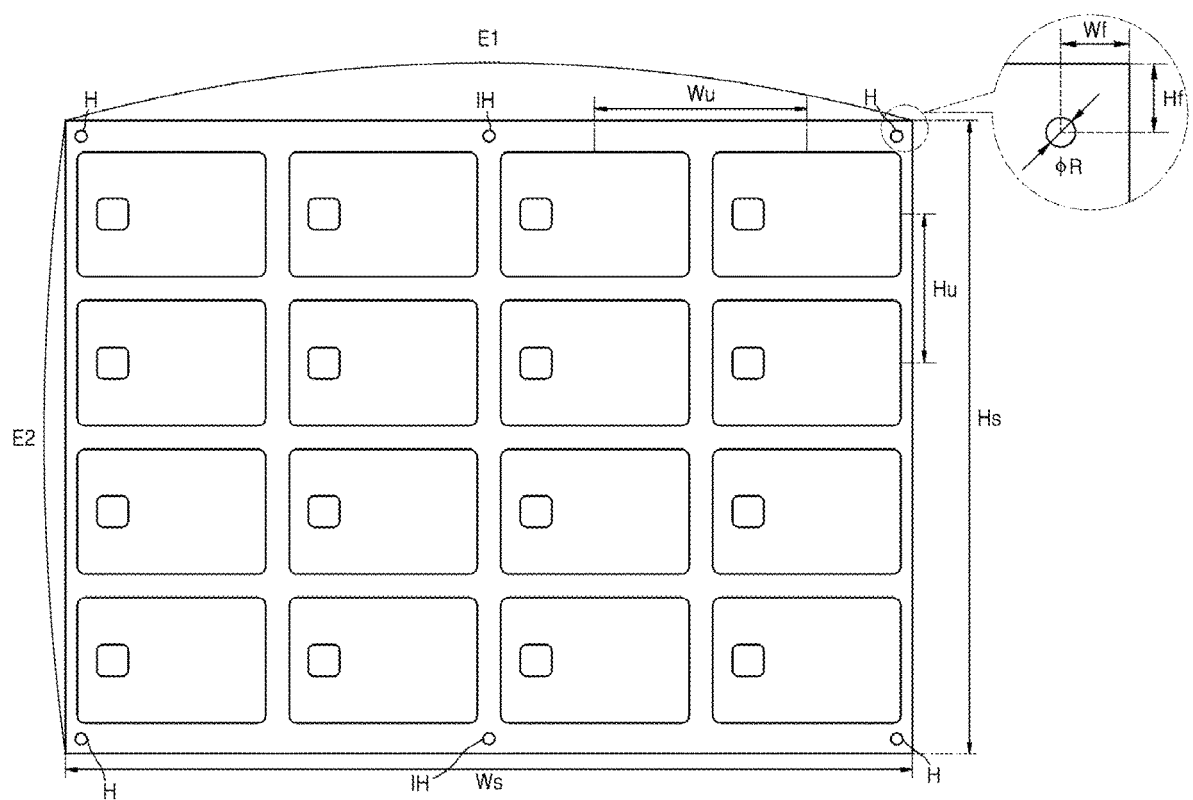
FIG. 10 is a top view showing holes formed on the large-scale sheet where the metal cards are arranged.

FIG. 10 is a top view showing the holes formed on the sheets for making the metal cards. The holes H are formed adjacent to each other from at least one edge of the individual sheet by a predetermined distance, and otherwise, the holes H may be formed on positions adjacent to peaks at which the two or more edges of the individual sheet meet by a predetermined distance. As shown in FIG. 10, the four holes H are formed on the peaks at which the longitudinal edge E1 and the transverse edge E2 of the rectangular sheet are adjacent to each other. Each hole H is formed at a position spaced apart from the transverse edge E2 of each sheet by a fixing width Wf and from the longitudinal edge E1 of each sheet by a fixing height Hf. According to the present disclosure, the fixing width Wf and the fixing height Hf are substantially same as each other.

Further, each hole H is formed to a size of a predetermined radius R. The predetermined radius R of the hole H is determined based on the radius of the pin for fixing the hole H, the material characteristics of the sheets, and the sizes of the sheets. For example, the radius R of the hole H is 3 mm.

According to the present disclosure, further, internal holes IH are formed at positions adjacent to the transverse edge or the longitudinal edge of each sheet in such a manner as to be spaced apart from one edge by the predetermined distance.

In addition to the holes H formed on the peaks of the sheet, the internal holes IH are formed adjacent to the edges of the sheet along the transverse and longitudinal directions, thereby preventing the intermediate portions of the plurality of sheets from being twisted. As the number of individual cards is increased through one sheet, that is, as the size of the sheet becomes large, the number of holes is increased. As the sheets are fixed to each other through the holes, the sheets for constituting the metal cards are more accurately arranged, so that the thickness outlines, that is, cut surfaces, of the metal cards formed through the cutting can be evenly formed.

For example, as shown in FIG. 10, at least one internal hole IH is formed at the position spaced apart from the longitudinal edge E1 by the predetermined distance on the center of the longitudinal edge E1.

Like this, in making the metal cards according to the present disclosure, the respective layers are provided to the form of the large-scale sheets and bonded to make one sheet. Next, the large-scale sheet is cut off to sizes of individual cards to make the individual metal cards. By the way, it is not easy to prepare the insulating sheet 150s as the insulating layer 150, and if the insulating layer 150 is a little bent, the materials for constituting the insulating layer 150 may be broken. Even though the insulating layer 150 containing the ferrite has good magnetic force adjusting characteristics, it is difficult to adopt the insulating layer 150 in the process for the large-scale sheet.

So as to adopt the insulating layer 150 containing the ferrite in the process for the large-scale sheet, a method for making the insulating layer strong to external impacts and easy in shape machining is contained in the method according to the present disclosure.

Figure 11:
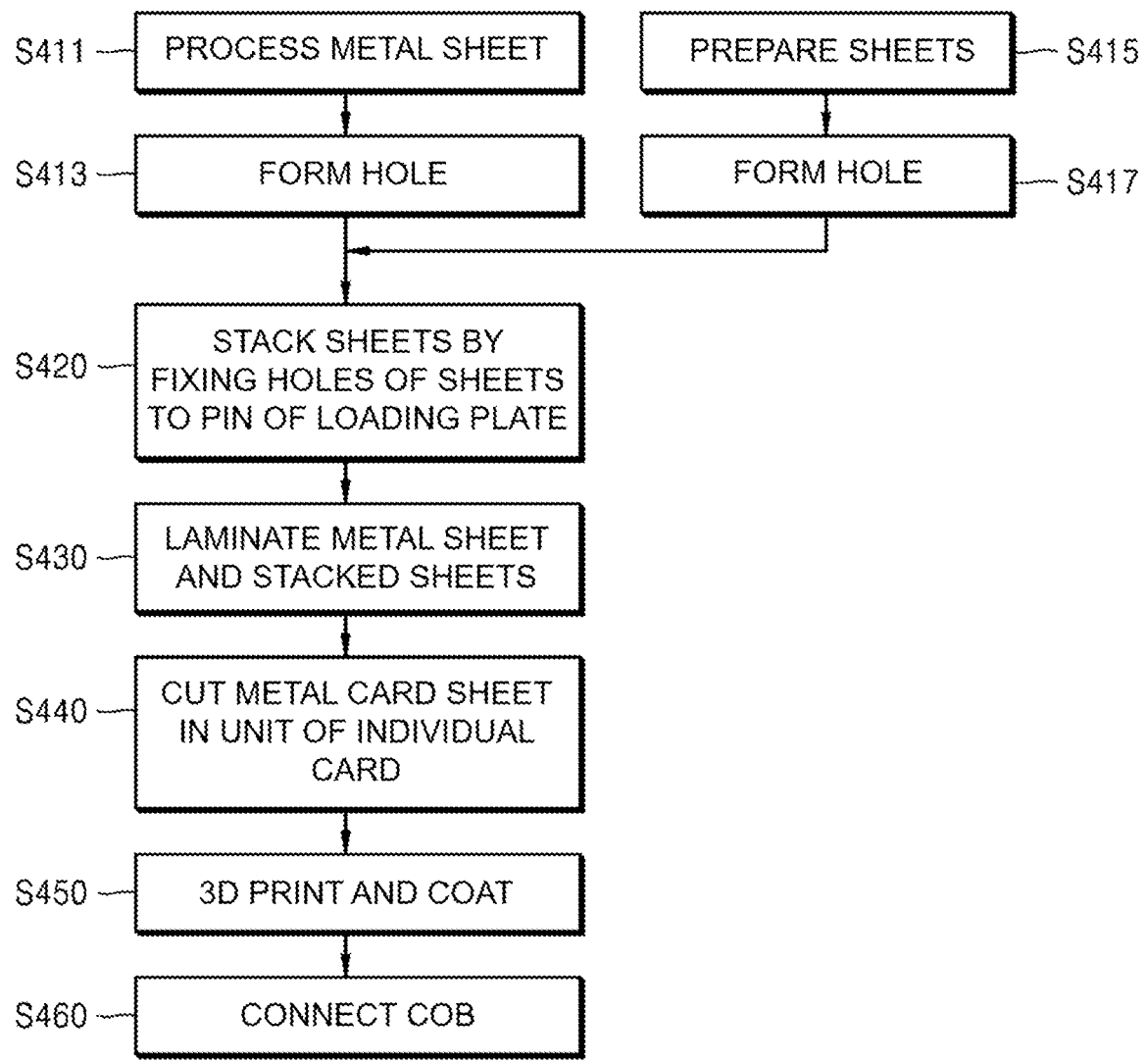
FIG. 11 is a flowchart showing a method for manufacturing a plurality of individual metal cards according to the present disclosure.

FIG. 11 is a flowchart showing a method for manufacturing the metal cards according to the present disclosure.

A metal sheet 110s made of a metal material is processed (at step S411). A process for machining the metal sheet 110s includes the steps of forming spaces for inserting the processed layers 120 and exposing a portion of each processed layer 120 after the processed layer 120 has been inserted into the metal sheet 110s. According to the present disclosure, the processed layer insertion spaces are formed on the metal sheet 110s or the processed layers 120 are exposed through the CNC process. Each processed layer 120 has a lower thickness than the metal sheet 110s, so that it can be inserted into the metal sheet 110s. As each processed layer 120 is located only on given areas of the metal card 100, it is not prepared to the form of the sheet.

Figure 4C:
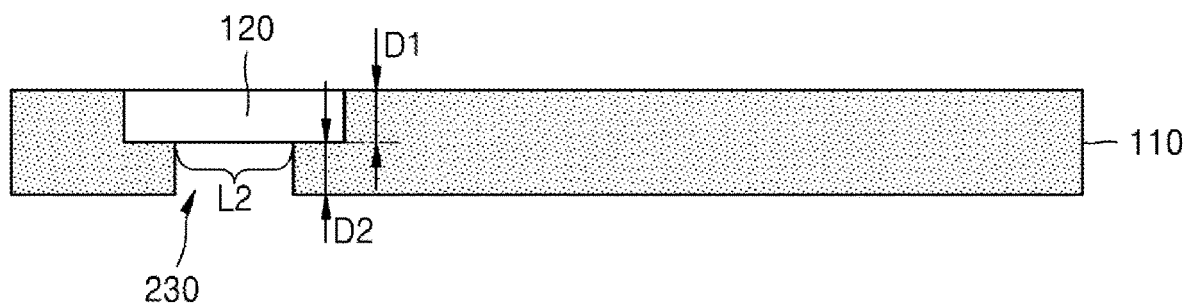

As shown in FIGS. 4A to 4C, the section of the metal layer 110 has been suggested to explain the machining process of the metal layer 110. According to the present disclosure, a plurality of metal cards 100 are formed on one metal sheet 110s, and accordingly, the plurality of processed layers 120 have to be inserted into the metal sheet 110s. For the convenience of the description, however, the explanation on the metal layer 110 on which one metal card 100 is formed has been given with reference to FIGS. 4A to 4C.

Referring to FIGS. 4A to 4C, the processed layer insertion space 210 into which the processed layer 120 is insertable is formed on the metal layer 110. The processed layer insertion space 210 has the first machining width L1 and the first machining depth D1. As shown in FIG. 4B, further, the processed layer 120 is inserted into the processed layer insertion space 210 formed through the CNC process, and according to the present disclosure, it can be inserted thereinto, without any adhesive. At this time, the thickness of the processed layer 120 is ½ of the thickness of the metal layer 110.

Next, as shown in FIG. 4C, the opposite side metal layer 110 to the processed layer 120 is machined to form the processed layer exposure portion 230 from which the processed layer 120 is exposed. At this time, the second machining width L2 of the processed layer exposure portion 230 is shorter than the width of the processed layer insertion space 210. This is to prevent the processed layer 120 from being separated from the metal layer 110 at the time when the metal sheet 110s is bonded to the stacked sheets later.

Referring back to FIG. 11, the holes are formed on the metal sheet 110s (See FIG. 13) into which the processed layers 120 are inserted (at step S413). As shown in FIG. 10, the holes are formed spaced apart from at least one edge of the metal sheet 110s by the predetermined distance. According to the present disclosure, otherwise, the processed layers 120 may be inserted into the metal sheet 110s after the holes are formed on the metal sheet 110s.

While the machining process and the hole forming process for the metal sheet 110s are being carried out, the insulating sheet 140s is prepared. As mentioned above, the insulating sheet 140s is made by adding epoxy to the ferrite, so that it is not easily broken to provide excellent adhesion force and handling performance.

In addition to the insulating sheet 150s, the plurality of sheets inclusive of the inlay sheet 170s are prepared. According to the present disclosure, further, the printed sheet 180s and the magnetic strip sheet 190s are prepared (at step S415). The respective sheets are made of proper materials in consideration of their functions and machining processes as mentioned above.

The wireless antenna coil, which are designed to be adequate for the receiver sensitivity required in the metal card and for the sizes of the individual cards are printed on the inlay sheet 170s, and the information on the card is printed on the printed sheet 180s. The magnetic strip on which information on card payment is magnetically recorded cuttedly matches with the magnetic strip sheet 190s.

The insulating sheet 150s is located between the first adhesive sheet 140s and the second adhesive sheet 160s, and the holes are formed on the plurality of sheets after the sheets have been stacked. Otherwise, the sheets are stacked after the holes have been formed on the sheets. According to the present disclosure, the plurality of sheets located on the bottom side of the metal sheet 110s are called stacked sheets.

Hole punching is performed onto the respective hole positions of the sheets by means of hole punching equipment (at step S417). As mentioned with reference to FIG. 10, the holes H or the internal holes IH are indicated on the respectively stacked sheets, and they are punched through the hole punching equipment.

Figure 12:
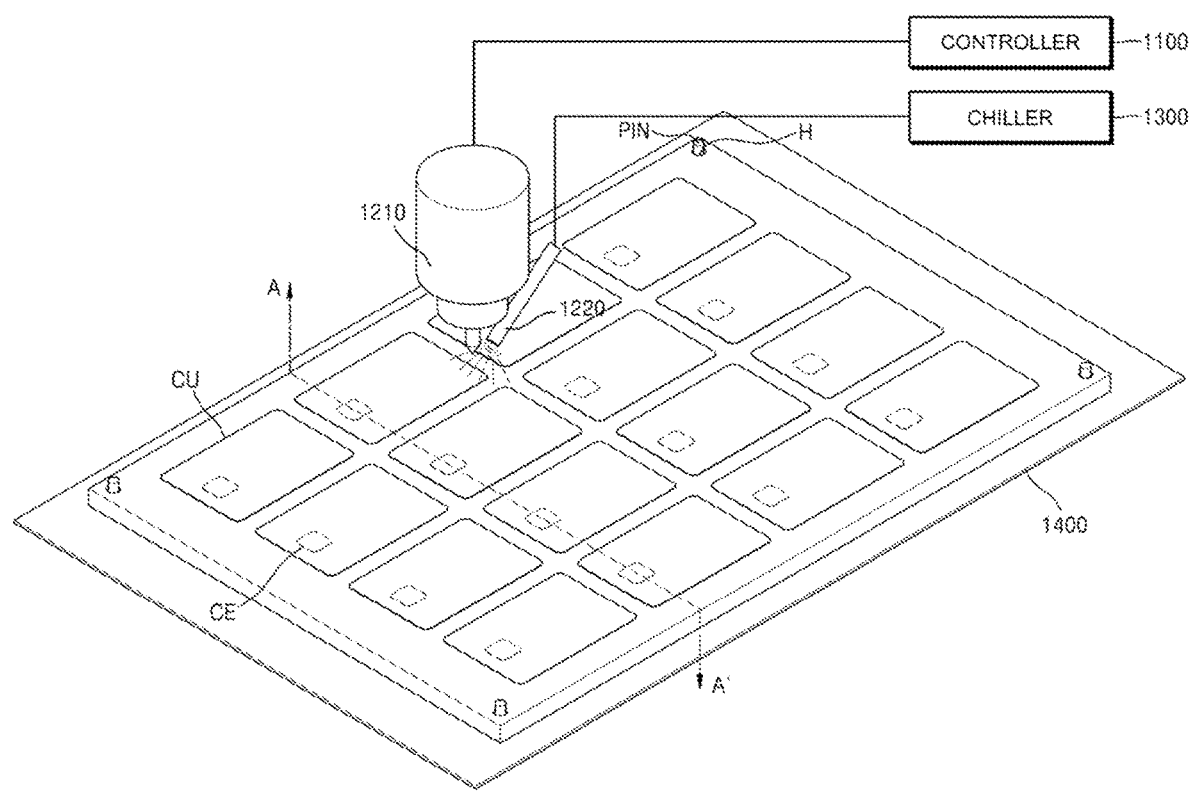
FIG. 12 is a perspective view showing a process for cutting a metal card sheet in the method according to the present disclosure.

FIG. 12 is a perspective view showing a process for cutting a metal card sheet in the method according to the present disclosure.

As shown in FIG. 12, the pins PIN located on a loading plate 1400 are inserted into the holes H formed on the stacked sheets. In the same order as mentioned with reference to FIG. 1, the stacked sheets prepared (through the step S417) are loaded on the loading plate 1400, and the metal sheet 110s prepared (through the step S413), in detail, the metal sheet 110s into which the processed layers 120 are inserted and having the processed layer exposure portions 230 formed thereon is loaded on the top of the stacked sheets (at step S420).

The metal sheet 110s and the stacked sheets, which are arrangedly stacked through the pins PIN, are laminated by means of heating and pressurization (at step S430). In more detail, the lamination process is carried out by applying a pressure of 20 kg/cm² to the stacked sheets and the metal sheet at a temperature of 150° C. for about 10 minutes and by then cooling the stacked sheets and the metal sheet in a state of maintaining the same pressure as above. According to the present disclosure, as mentioned above, the laminating process of the metal card is carried out at a lower temperature and a lower pressure than that in the plastic card. Further, the time of the laminating process of the metal card is shorter than that in the plastic card. According to the present disclosure, the time of the laminating process and the heat treatment conditions such as temperature, pressure, and so on are determined in consideration of adhesion force, thickness of the metal sheet, and PVC contraction. If the thickness of the metal sheet is high, for example, the temperature for the laminating process is raised. Further, the PVC material is more easily contracted or extended than the metal sheet, and accordingly, the laminating time and temperature can be determined in consideration of the degree of deformation (contraction and extension) of the PVC material at the time of the laminating process.

The plurality of sheets is bonded to each other by means of the laminating process, and as the first adhesive sheet 140*s* and the second adhesive sheet 160*s* are melted and cooled, especially, the plurality of sheets are strongly bonded to each other. Since the epoxy is contained in the insulating sheet 150*s*, furthermore, the adhesion of the insulating sheet 150*s* with the first adhesive sheet 140*s* and the second adhesive sheet 160*s* adjacent thereto can be improved.

In the description of the present disclosure, one physical sheet after the laminating process is called a metal card sheet 100*s*. According to the present disclosure, the individual card unit cutting is performed in the state where the pins PIN of the loading plate 1400 are inserted into the holes of the metal card sheet 100*s* (at step S440). According to the present disclosure, the loading plate on which the laminating process is carried out is different from a loading plate on which cutting is carried out. After the laminating process is performed, the metal card sheet 100*s* moves to the different loading plate, and then, the cutting process is carried out. However, the configurations of the two loading plates are the same as each other in view of the fact that the metal card sheet 100*s* is fixed by the pins PIN.

As shown in FIG. 12, the metal card sheet 100*s* is cut off along the individual card outlines CU by means of a cutting tool 1200, thereby making the individual cards. The cutting tool 1200 includes a cutter 1210 and an injector 1220 for injecting a coolant.

The cutter 1210 is made of a specific material according to the characteristics of the metal sheet 110*s* and the material characteristics of the metal card sheet 100*s*. For example, the cutter 1210 is made of a material having higher strength than the metal sheet 110*s*. The injector 1220 injects alcohol cooled by a chiller 1300.

According to the present disclosure, in the process where the metal card sheet 100*s*, especially, the metal sheet 110*s* is cut, substantially large amounts of heat and flame are generated, and the heat and flame give bad influences on other components or change the shape of the metal sheet 110*s*. Accordingly, the alcohol cooled by the chiller 1300 is immediately injected into a position cut through the cutter 1210, thereby minimizing the influences caused by the generation of the heat or flame.

The cutting process through the cutting tool 1200 is carried out by means of the CNC process, and the CNC process is controlled by means of the controller 1100 as shown in FIG. 12. Through the cutting process, as shown in FIG. 12, the individual card outlines CU are cut, and on the other hand, chip exposure areas CE at the inside of the metal sheet 110*s*, while transversing the processed layers 120 inserted into the metal sheet 110*s*, are cut to allow the antenna coil of the inlay sheet 170*s* to be exposed.

According to the present disclosure, further, the controller 1100 controls the operations of the cutting tool 1200, especially, the CNC process of the cutting tool 1200. According to the present disclosure, if the cutting operations of the cutting tool 1200 are over the number of times in advance set, the controller 1100 operates to exchange the cutting tool 1200 with new one. So as to exchange the cutting tool 1200, the controller 1100 records the number of times of the cutting operations performed by the cutting tool 1200, and if the cutting operations are performed over the number of times in advance set, the controller 1100 exchanges the cutting tool 1200 with new one. According to the present disclosure, especially, the controller 1100 exchanges the cutter 210 of the cutting tool 1200 with new one. In detail, the metal card manufacturing apparatus for implementing the metal card manufacturing method according to the present disclosure is provided with a plurality of cutters, and accordingly, the cutters are exchanged sequentially according to the control of the controller 1100. As the cutters are exchanged sequentially, the metal card manufacturing process does not stop, thereby improving production efficiency.

According to the present disclosure, furthermore, the metal card manufacturing apparatus is provided with a monitor (not shown) for monitoring the cutting operations of the metal card sheet 100*s* to check whether the cutting operations are carried out well or not. According to the monitoring results, the controller 1100 determines whether the cutting tool 1200 is exchanged or not. For example, the monitor continuously observes cutting success rates of the metal card, the evenness of the cut surfaces, and so on.

FIGS. 13 and 14 are sectional views taken along the line A-A' of FIG. 12, wherein FIG. 13 shows the metal card layers before cutting and after laminating and FIG. 14 shows the metal card layers after cutting.

As shown in FIG. 13, the processed layers 120 are inserted into one surface of the metal sheet 110*s*, and the processed layer exposure portions 230 are formed on the other surface thereof. According to the present disclosure, the metal card sheet 100*s* is obtained by allowing the surface of the metal sheet 110*s* into which the processed layers 120 are inserted to come into contact with the top surface of the stacked sheets, that is, the insulating sheet 150*s* (except the adhesive layer) of the stacked sheets.

Referring to FIG. 14, the chip exposure area CE is machined by a depth at which the inlay layer 170 is exposed. The chip exposure area CE has the third machining width L3 shorter than the second machining width L2. The reason why the third machining width L3 is shorter than the second machining width L2 is to ensure the connection characteristics of the COB in the following individual metal card process. The individual metal card process will be explained with reference to FIG. 14.

Each individual card outline CU is cut by a thickness corresponding to the entire thickness of the metal card sheet 100*s*. As shown in FIG. 14, it can be checked that as the chip exposure area CE is cut at the step S430, the inlay layer 170 is exposed to the outside, and it can be also checked that as the metal card sheet 100*s* is cut along the individual card outlines CU, the individual metal cards 100_1, 100_2, 100_3, and 100_4 are made.

As the metal card sheet 100*s* is cut, the plurality of individual metal cards 100_1, 100_2, 100_3, and 100_4 are made, and the individual metal card processes for the respective individual metal cards are carried out. For example, the three-dimensional printing and coating for the individual metal cards cut in the unit of the sheet are performed (at step S450), and next, the COB is connected to each individual metal card (at step S460).

As shown in FIG. 14, the insulating layer 150 is cut several times in making the metal card. Above all, accordingly, it is very important to improve the handling performance of the insulating layer 150. In the metal card manufacturing method according to the present disclosure, the insulating sheet 150s has a shape of a sheet made of ferrite inclusive of epoxy, thereby effectively controlling the magnetic field between the metal layer 110 and the antenna coil of the inlay layer 170 and providing stability in the manufacturing process to produce the metal card in large quantities.

Figure 15A:
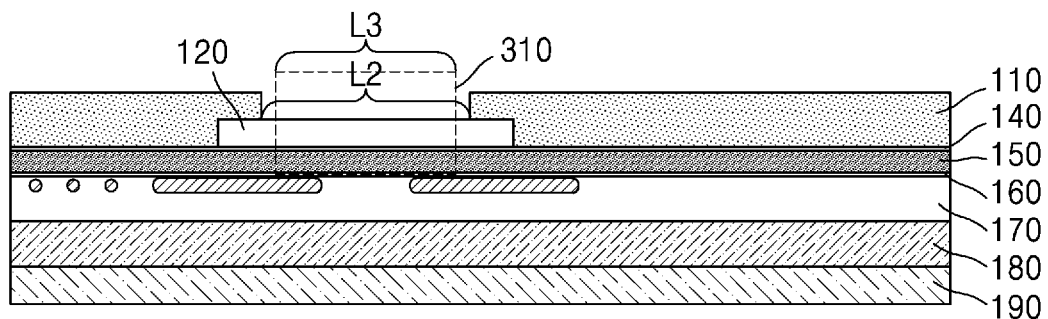
FIGS. 15A to 15C are sectional views showing the metal card on which a COB is mounted through connection between the COB and an inlay layer in an individual metal card process.
Figure 15B:
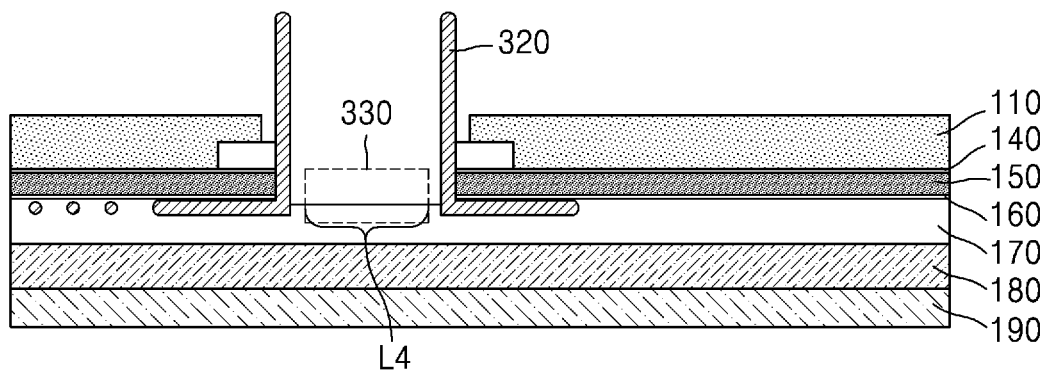
Figure 15C:
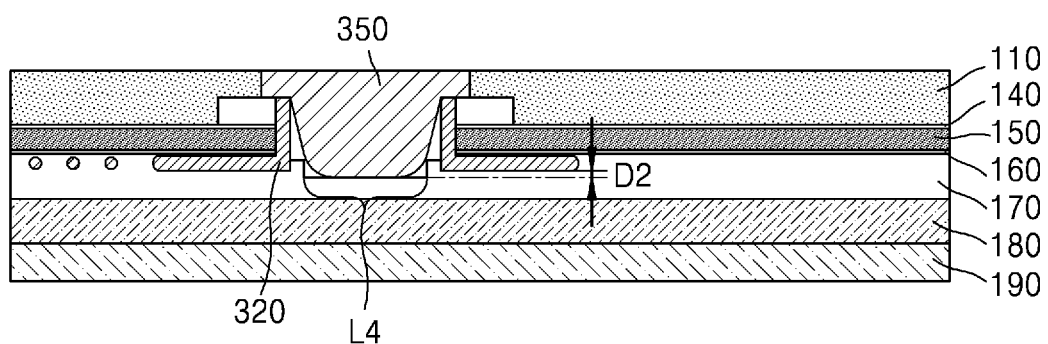

FIGS. 15A to 15C are sectional views showing the step S460 of FIG. 11 in which the antenna coil of the inlay layer are connected to the COB in the individual metal card process. FIG. 15A in detail shows the exposed shape of the inlay layer 170 on the chip exposure area CE as mentioned with reference to FIG. 14, through the CNC process.

If the inlay layer 170 is exposed, the antenna coil 320 printed on the inlay layer 170 are lifted upward through the first milling process as shown in FIG. 15B. For example, the first milling process is carried out, as shown in FIGS. 15A to 15C, in the state where the processed layer exposure portion 230 is located in the up direction with respect to the metal card 100 into which the processed layer 120 is mounted.

Since the third machining width L3 is shorter than the second machining width L2, the antenna coil 320 do not come into contact with the metal layer 110, even while moving upward.

As the antenna coil 320 is lifted upward, the exposed inlay layer 170 is machined one more time to form the given recess 330 for accommodating the COB 350 and to achieve flattening on the front surface of the metal card. If the second milling process is finished, as shown in FIG. 15C, the COB 350 is inserted into the accommodation recess 340. The width of the accommodation recess 340 is shorter than the third machining width L3 and the depth thereof is equal to the depth D2 corresponding to the thickness (or the thickness of the protruding portion) of the rear surface of the COB. After that, the antenna coil 320 lifted upward is connected with the contact points of the COB 350 by means of spot welding, and the COB 350 is seated on the accommodation recess 340. At this time, an adhesive (for example, hot melt adhesive) is applied to the rear surface of the COB 350. Even if the metal layer 110 is provided, like this, the COB and the antenna coil are efficiently connected to each other in the individual metal card process, while electrical contacts therebetween are being blocked.

Next, as shown in FIG. 8, the primer is applied to the metal card 100 after the connection to the COB, thereby forming the primer layer. At this time, the primer serves as a material for improving the preservation force of the printed information according to the material of the metal layer. Next, card information, pattern, and picture image are formed engravedly on the metal layer 110 onto which the primer is coated through the 3-D printing process. After that, the coated layer is formed to protect the uppermost surface of the metal card 100, so that the information formed through the 3-D printing process is not abraded or removed.

According to the present disclosure, as described above, the metal card manufacturing method is carried out by stacking the large-scale sheets capable of producing the plurality of cards and cutting the large-scale sheets to the unit of individual cards, thereby making the plurality of metal cards at a time through one-time sheet process.

According to the present disclosure, further, the metal card manufacturing method is carried out by injecting cooled air into the surfaces of the stacked large-scale sheets inclusive of the metal sheet as soon as the individual card outlines are cut along the surfaces of the stacked sheets, thereby stably cutting the individual card outlines.

According to the present disclosure, furthermore, the metal card manufacturing method is carried out by forming the holes on the large-scale sheets to prevent the large-scale sheets from being twisted in the process for cutting the large-scale sheets and by fixing the pins to the holes, so that the individual card outlines are cut, while the arranged states of the large-scale sheets are being maintained.

According to the present disclosure, in addition, the metal card manufacturing method is carried out with the insulating layer formed to a shape of a stable sheet for efficiently controlling magnetic interferences between the metal layer and the antenna coil performing contactless communication, thereby making the metal cards of which operational performance is improved in large quantities.

The present disclosure may be modified in various ways and may have several exemplary embodiments. Specific exemplary embodiments of the present disclosure are illustrated in the drawings and described in detail in the detailed description. However, this does not limit the invention within specific embodiments and it should be understood that the invention covers all the modifications, equivalents, and replacements within the idea and technical scope of the invention. For example, each singular component may be dispersed, and also, the components dispersed may be coupled to each other.

It is therefore intended that the scope of the invention be limited not by this detailed description, but rather by the claims appended hereto. It is to be appreciated that those skilled in the art can change or modify the embodiments without departing from the scope and spirit of the present disclosure.

The invention claimed is:

1. A method for manufacturing a metal card, the method comprising:
   preparing a metal sheet having a size capable of accommodating a plurality of individual cards;
   heat treating the metal sheet made of a SUS material to improve strength and tension thereof;
   forming an insertion space for a processed layer on each area of a bottom side of the metal sheet by means of CNC (Computerized Numerical Control) machining;
   inserting a processed layer made of a PVC plastic material into the insertion space for the processed layer;
   forming an exposure portion of the processed layer by cutting a top surface of the metal sheet to expose the processed layer;
   forming a metal card sheet by stacking the metal sheet and a plurality of sheets each having the same size as the metal sheet and including an adhesive sheet and an inlay sheet on which one or more antenna coils are printed, and laminating the metal sheet and the plurality of sheets on each other;
   producing an individual card having the processed layer, a metal layer formed from the metal sheet, and an inlay layer formed from the inlay sheet by cutting the metal card sheet along outlines of the plurality of individual cards including the individual card;
   forming a COB (Chip-On-Board) insertion area by performing a first milling process for the processed layer and the stacked sheets on a bottom side of the metal layer through the exposure portion of the processed layer of the individual card;

connecting the one or more antenna coils exposed through the first milling process with a one or more contact portions formed on a rear surface of a COB pad; and mounting the COB pad connected with the one or more antenna coils onto the COB insertion area of the metal layer, wherein the COB insertion area is formed to accommodate the rear surface of the COB pad and to minimize a spare space except the space for connecting to the antenna coil, wherein the connecting the one or more antenna coils of the inlay layer with the one or more contact portions of the rear surface of the COB pad is performed by spot welding process.

2. The method according to claim 1, further comprising:
depositing a color onto the metal sheet after the metal sheet is subjected to the heat treatment; and
producing patterns, images, or characters on the metal sheet by means of digital printing using UV ink.

3. The method according to claim 1, further comprising:
forming a hole on at least one edge of the stacked sheets; and
fixing the stacked sheets by inserting a pin of a loading plate into the holes formed on the stacked sheets.

4. The method according to claim 1, wherein the forming the COB insertion area further comprises:
performing a second milling process for a portion of the inlay sheet exposed through the first milling process; and
forming an accommodation recess for accommodating a protruding portion protruded from the rear surface of the COB pad.

5. The method according to claim 1, wherein the heat treating the metal sheet is carried out according to heat treatment conditions with predetermined temperature, pressure, and time, and the heat treatment conditions are determined based on at least one of an adhesion force, a degree of deformation of the processed layer, and a thickness of the metal sheet.

6. The method according to claim 1, further comprising:
applying a primer to the metal sheet to which the COB pad is attached;
printing card information on the metal sheet to which the primer is applied; and
coating the metal sheet on which the card information is printed.

7. A metal card comprising:
a metal sheet made of a SUS material and subjected to a heat treatment to improve strength and tension thereof;
a processed layer made of a PVC plastic material and inserted in an insertion space formed on one side surface of the metal sheet by CNC (Computerized Numerical Control) machining; and
a plurality of sheets stacked on the opposite side surface of the metal sheet in which processed layers including the processed layer are inserted, so as to be laminated onto each other,
wherein the opposite side surface of the metal sheet is machined to form an exposure portion of the processed layer; the processed layers and the plurality of sheets are cut, through a first milling process for given areas of exposure portions of the processed layers, to form a COB insertion area where one or more antenna coils of an inlay layer are exposed; and the COB insertion area is formed to accommodate a COB pad attached to the metal sheet after the one or more antenna coils and the COB pad are connected to each other and to minimize a spare space except the space connected to the one or more antenna coils,
wherein one or more contact points formed on the rear surface of the COB pad are connected to the one or more antenna coils by spot welding process.

8. The metal card according to claim 7, wherein a depth of the insertion space for the processed layer is smaller than a depth of the metal layer, and wherein an area and a shape of the insertion space for the processed layer correspond to those of the processed layer.

9. The metal card according to claim 7, wherein the COB insertion area comprises an accommodation recess formed through a second milling process for a portion of the inlay sheet exposed through the first milling process to accommodate a protruding portion protruded from the rear surface of the COB pad.

10. The metal card according to claim 7, wherein the plurality of sheets comprises at least one adhesive sheet, an insulating sheet, an inlay sheet, and a printed sheet.

11. The metal card according to claim 7, further comprising:
a primer layer applied to the metal sheet to which the COB pad is attached;
a printed layer formed on the metal sheet to which the primer is applied so as to print card information; and
a coated layer formed on the metal sheet on which the card information is printed to coat the metal sheet.

\* \* \* \* \*